US009294446B2

(12) United States Patent
Hill-Jowett

(10) Patent No.: US 9,294,446 B2
(45) Date of Patent: Mar. 22, 2016

(54) CONTENT ENCRYPTION

(75) Inventor: David Richard Hill-Jowett, Basingstoke (GB)

(73) Assignees: Sony Corporation, Toyko (JP); Sony Europe Limited, Weybridge (GB)

(*) Notice: Subject to any disclaimer, the term of this patent is extended or adjusted under 35 U.S.C. 154(b) by 12 days.

(21) Appl. No.: 14/006,450

(22) PCT Filed: Feb. 24, 2012

(86) PCT No.: PCT/GB2012/050429
§ 371 (c)(1),
(2), (4) Date: Sep. 20, 2013

(87) PCT Pub. No.: WO2012/131316
PCT Pub. Date: Oct. 4, 2012

(65) Prior Publication Data
US 2014/0013115 A1 Jan. 9, 2014

(51) Int. Cl.
*H04L 29/06* (2006.01)
*H04N 21/266* (2011.01)
(Continued)

(52) U.S. Cl.
CPC ...... *H04L 63/0428* (2013.01); *H04N 21/26613* (2013.01); *H04N 21/4181* (2013.01); *H04N 21/43607* (2013.01); *H04N 21/4623* (2013.01);
(Continued)

(58) Field of Classification Search
USPC .......................................... 713/168, 193, 171
See application file for complete search history.

(56) References Cited

U.S. PATENT DOCUMENTS

| 5,784,464 A | 7/1998 | Akiyama et al. |
| 2004/0052377 A1* | 3/2004 | Mattox et al. ................. 380/277 |

(Continued)

FOREIGN PATENT DOCUMENTS

| EP | 1 562 318 | 8/2005 |
| GB | 2 387 090 | 10/2003 |
| WO | 2011 071423 | 6/2011 |

OTHER PUBLICATIONS

"CI Plus Specification. Content Security Extensions to the Common Interface.", CI Plus Specification, vol. 1.3, Total 316 Pages, (Jan. 2011).

(Continued)

*Primary Examiner* — Brandon Hoffman
*Assistant Examiner* — Samuel Ambaye
(74) *Attorney, Agent, or Firm* — Oblon, McClelland, Maier & Neustadt, L.L.P.

(57) ABSTRACT

An audio/video content delivery system includes a content source linked by an internet data connection to a content receiver, the content receiver configured to receive access-controlled encoded broadcast content from a content source by a separate broadcast data path. The content source includes an encryptor sending encrypted content to the content receiver according to a content encryption key. The content receiver includes: a host module including a decryptor decrypting encrypted content received from the content source; and a removable conditional access module (CAM) including an access control unit decoding the access-controlled encoded broadcast content, the host module and removable CAM configured to provide an encrypted communication link therebetween for decoded access-controlled encoded broadcast content. The content source and the CAM are configured to communicate to establish the key required by the decryptor in the host module to decrypt the encrypted content received from the content source.

13 Claims, 7 Drawing Sheets

(51) Int. Cl.
*H04N 21/418* (2011.01)
*H04N 21/436* (2011.01)
*H04N 21/4623* (2011.01)
*H04N 21/6377* (2011.01)
*H04L 9/00* (2006.01)

(52) U.S. Cl.
CPC ............ *H04N 21/63775* (2013.01); *H04L 9/00* (2013.01); *H04L 29/06* (2013.01)

(56) References Cited

U.S. PATENT DOCUMENTS

| | | | |
|---|---|---|---|
| 2005/0005120 A1* | 1/2005 | Kahn et al. | 713/171 |
| 2005/0177741 A1 | 8/2005 | Chen et al. | |
| 2009/0077652 A1 | 3/2009 | Choi et al. | |
| 2012/0254618 A1 | 10/2012 | Moore | |
| 2013/0177154 A1 | 7/2013 | Hill-Jowett | |

OTHER PUBLICATIONS

Written Opinion of the International Searching Authority Issued Jun. 6, 2012 in PCT/GB12/050429 Filed Feb. 24, 2012.
Great Britain Search Report Issued Jul. 26, 2011 in Application No. GB1105156.2 Filed Mar. 28, 2011.
International Search Report Issued Jun. 6, 2012 in PCT/GB12/050429 Filed Feb. 24, 2012.
U.S. Appl. No. 14/440,393, filed May 4, 2015, Gutta.

\* cited by examiner

CONTENT ENCRYPTION

This invention relates to the encryption of audio/video content in systems delivering encrypted video and/or audio content such as television content.

As background technology, the DVB Common Interface ("CI") specification allowed a television receiver or set top box (a "host") to interact with a secure hardware module (a conditional access module or "CAM") to allow the host to decrypt access-controlled content. The CI specification defines an interface between the host and the CAM, so that the two will work together if both conform to the CI specification. This interoperability provided a significant benefit of the CI system, as, in principle, it allowed consumers a choice of compatible products from different manufacturers.

In the CI specification the CAM interacts with a smart card and/or a user's personal identification number ("PIN") to provide user authentication.

However, a disadvantage of the original CI specification is that it gave the potential for the decrypted digital content to be copied. This problem arises from the way in which the host and CAM interact. In use, the host sends encrypted data to the CAM. The CAM checks the user authentication and, assuming that the user is authenticated, it decrypts the access-controlled content. The CAM then sends the decrypted content back to the host over the CAM-host interface, which is generally a PCMCIA (Personal Computer Memory Card International Association) interface, though it is not limited to this interface—for example, a USB interface could be used. This connection from the CAM to the host represents a security weakness, in that the decrypted digital content can in principle be intercepted and unlawfully copied. This security weakness meant that some content providers preferred integrated devices, which have the host and CAM as a single unit, because this allowed them better security over the transfer of unencrypted data from the CAM to the host. However, this of course acted against the advantage associated with CI, relating to the potential interoperability of different CAMs and hosts.

The CI Plus specification was drafted to address these problems, by two main routes. CI Plus provides a secure interface between the CAM and the host, so that decrypted content data is not sent in clear form between the two devices. Also, CI Plus provides for the authentication of both the host and the CAM, rather than the CI technique of authenticating only the CAM.

The authentication system uses certificate hierarchy so that the host and the CAM must both have been issued certificates by an authority (such as CI Plus LLP).

The PCMCIA interface between a host and a CAM is protected by encrypting the decrypted content data before it is sent from the CAM to the host, and then decrypting it at the host. This encryption is separate to the access control encryption-decryption established by the content provider, and is specific to each particular CAM-host pair. Keys are exchanged between the CAM and host by the Diffie-Hellman key exchange technique. The keys are also cycled from time to time, so that even if a key was compromised, it would in any event be changed a few seconds later.

CI Plus provides further features such as so-called Usage Rights Information (URI) that allows the content provider to define the degree of content protection applied to content by the host.

In summary, using certificates issued by a certification authority, a trusted channel is formed between the CAM and host.

This invention provides an audio/video content delivery system comprising a content source linked by an internet data connection to a content receiver, the content receiver being configured to receive content from the content source via the internet data connection and to receive access-controlled encoded broadcast content from that or another content source by a separate broadcast data path, in which:

the content source comprises an encryptor for sending encrypted content to the content receiver via the internet data connection according to a content encryption key;

the content receiver comprises:

a host module having a decryptor for decrypting encrypted content received from the content source via the internet data connection; and a removable conditional access module (CAM), the CAM having an access control unit for decoding the access-controlled encoded broadcast content, the host module and the removable CAM being arranged to provide an encrypted communication link for decoded access-controlled encoded broadcast content between the conditional access module and the host module;

in which:

the content source and the CAM are configured to communicate via the internet data connection so as to establish the key required by the decryptor in the host module to decrypt the encrypted content received from the content source over the internet data connection. Such content may be sent on a node to node basis, i.e. a transmission to a specific receiver, or could be broadcast internet content.

The invention recognises that in a system using a CAM such as (though not exclusively) a CI Plus CAM, the host and CAM already have a secure encrypted communication path between them. Typically this will make use of a symmetrical encryption algorithm such as the AES algorithm.

Therefore, the invention recognises that this secure encrypted communication path can contribute to the establishment of one or more keys for the secure transmission of content from the content source to the content receiver.

In one example, at least a part of the shared key information used to establish the secure encrypted communication path between the CAM and the host can be sent, by the CAM, to the content source. In this way, the content source can encrypt the content for transmission to that host for decryption using a key already known to that host through the establishment of the secure encrypted communication path.

In another example, the CAM can negotiate a key with the content source for use by the host to decrypt the encrypted content. The CAM can then make use of the secure encrypted communication path to transmit that key to the host in a secure manner.

Embodiments of the invention will now be described, by way of example only, with reference to the accompanying drawings, in which.

Figure 4:
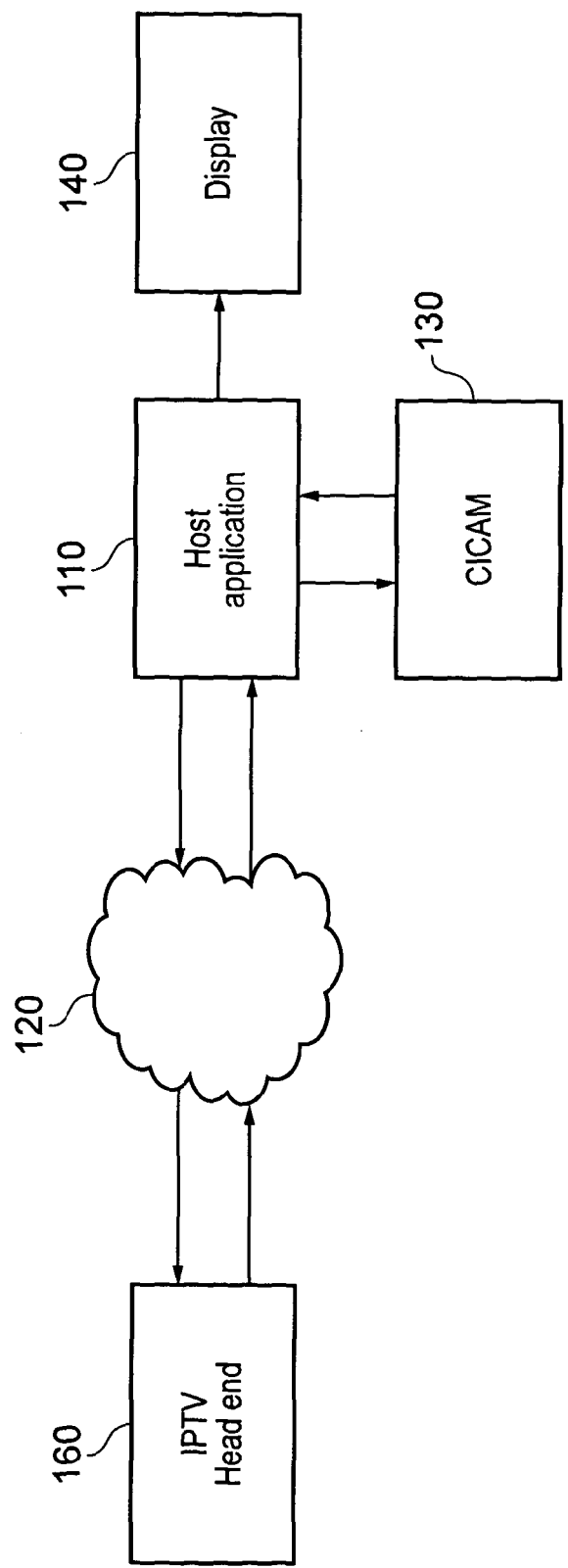
Figure 5:
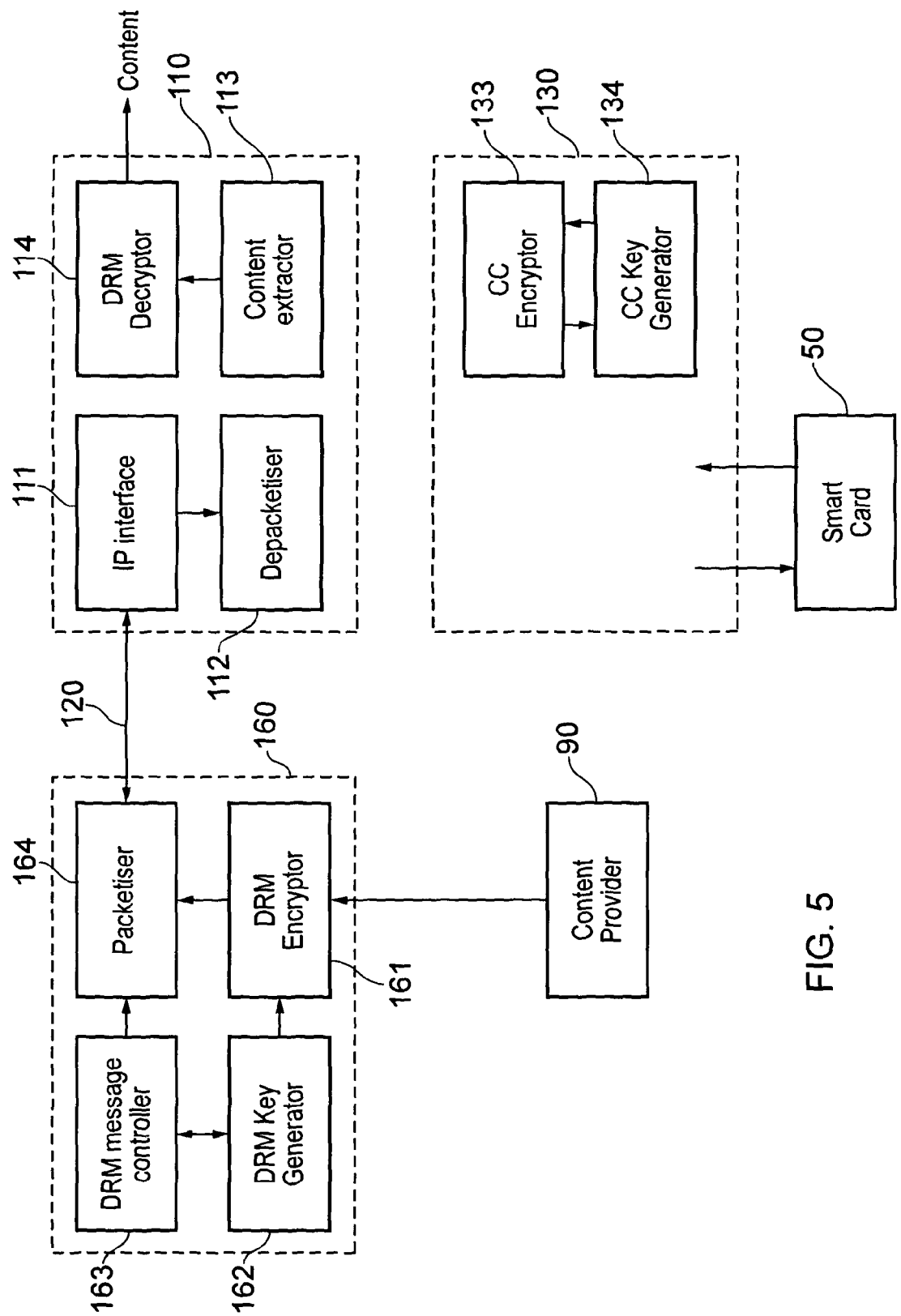
Figure 6:
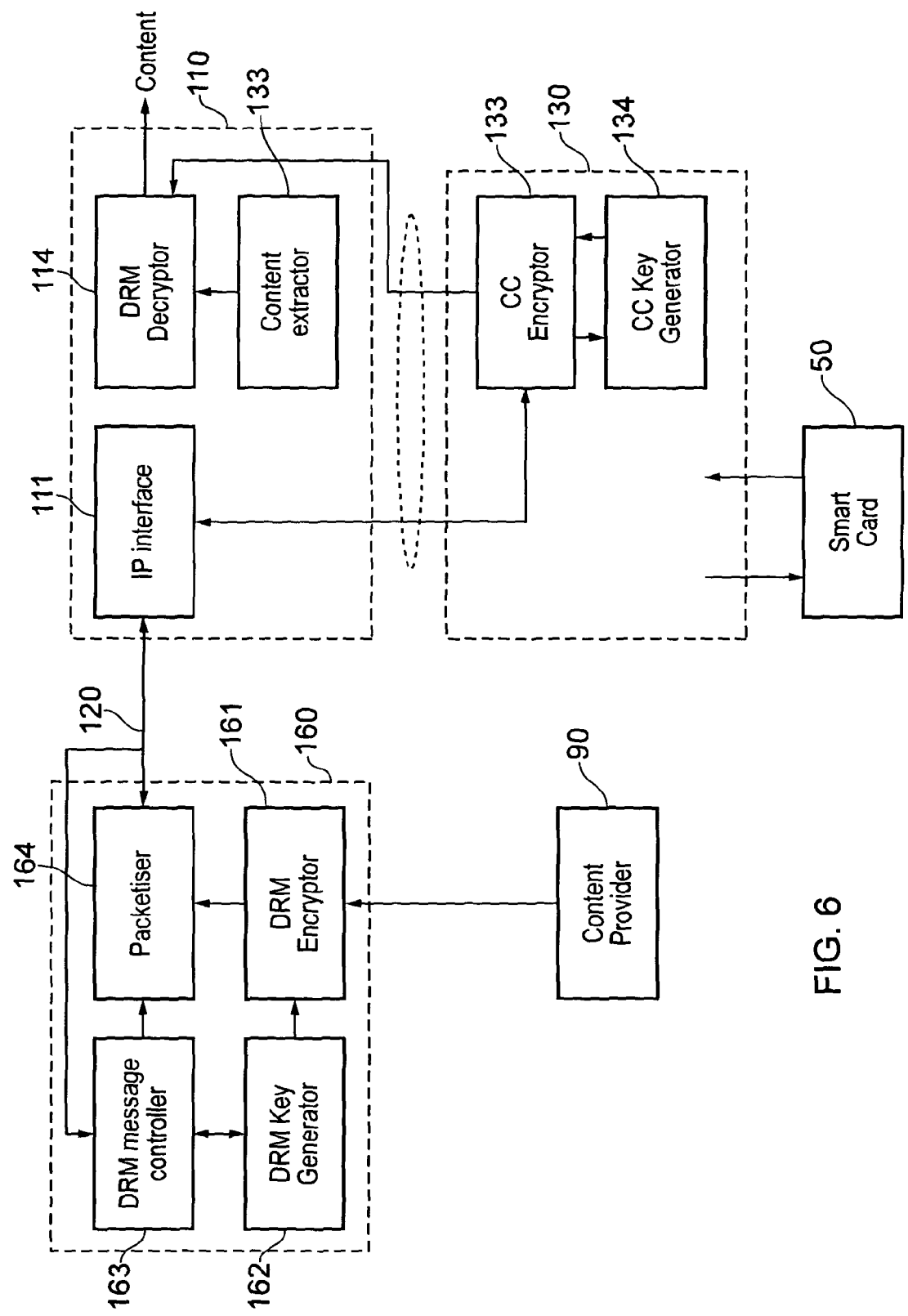
Figure 7:
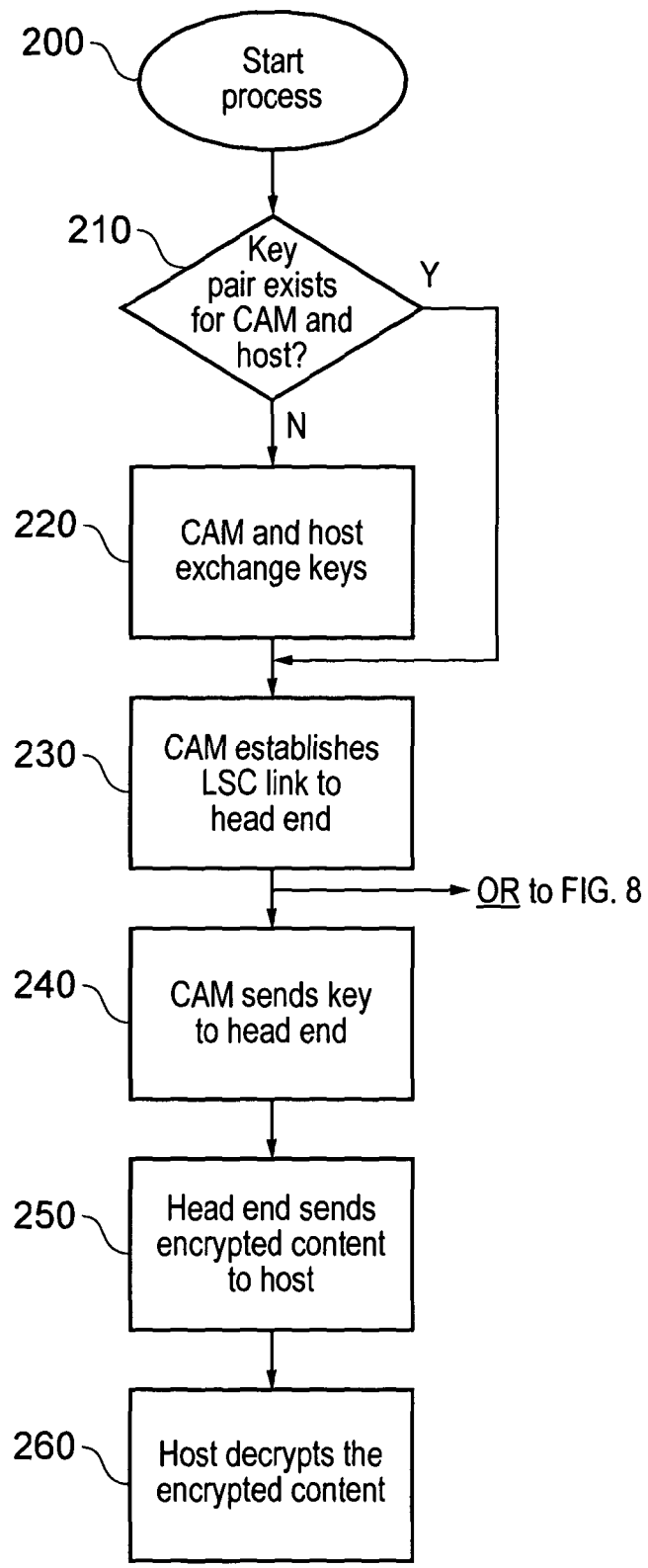
Figure 8:
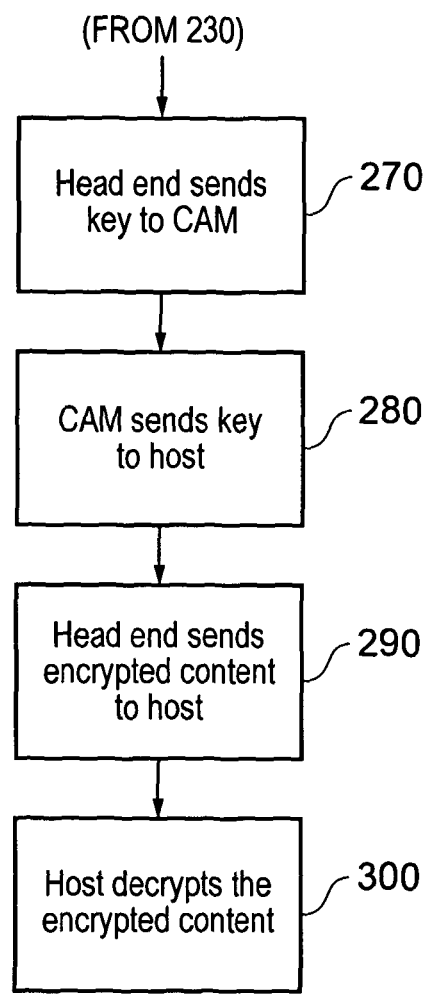

FIG. 4 schematically illustrates an IPTV audio/video content delivery system;

FIG. 5 schematically illustrates content signal handling within the IPTV content delivery system of FIG. 4;

FIG. 6 schematically illustrates key data handling within the IPTV content delivery system of FIG. 4;

FIG. 7 is a schematic flow chart illustrating one mode of operation of the system of FIG. 4; and FIG. 8 is a schematic flow chart illustrating another mode of operation of the system of FIG. 4.

Figure 1:
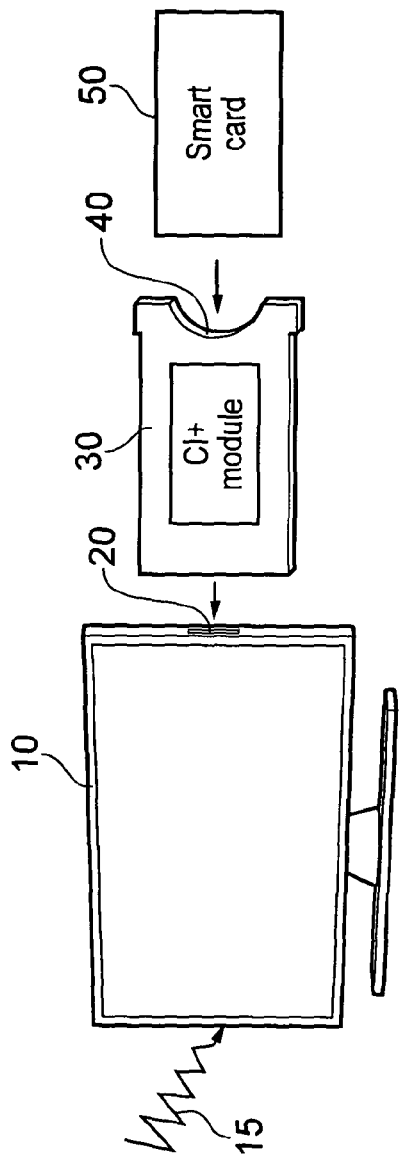
FIG. 1 is a schematic diagram of a host device with a CAM and a smart card.

Referring now to FIG. 1, a host device 10 is shown here as a television set but could be, for example, a set top box (noting that the expression "set top" does not imply, to the skilled person, any requirement for a particular physical position of the device in use). The host device 10 receives an access-controlled television signal 15 via a broadcast data path. This could be, for example, a satellite television signal received by a satellite dish (not shown), a terrestrial television signal, a cable television signal or the like, although other types of television signal will be discussed below. The host device 10 has a PCMCIA slot 20 which includes electrical connections and a physical space for a plug-in module, both according to the PCMCIA standard.

A CI Plus conditional access module, referred to as a CICAM 30, is a PCMCIA module which can be plugged into the PCMCIA slot 20. When the CICAM 30 is fully plugged into the slot 20, electrical connections are made between connectors on the CICAM 30 and cooperating connectors within the slot 20. Note that although the embodiments are described with respect to a CI Plus CAM, other types of removable CAM are applicable to the present techniques.

The CICAM itself may be a cardless module or may have a slot 40 into which a so-called smart card 50 may be inserted. The smart card is removable and carries information defining a current user of the content receiver in a tamper-proof, secure and non-volatile form. When the smart card is fully inserted in the slot 40, a data connection is formed between the smart card 50 and the CICAM 30, either by using cooperating electrical connectors on the smart card 50 and within the slot 40, or by using a known contactless connection technique in which data is transferred wirelessly over a very short range such as 1-2 cm.

Figure 2:
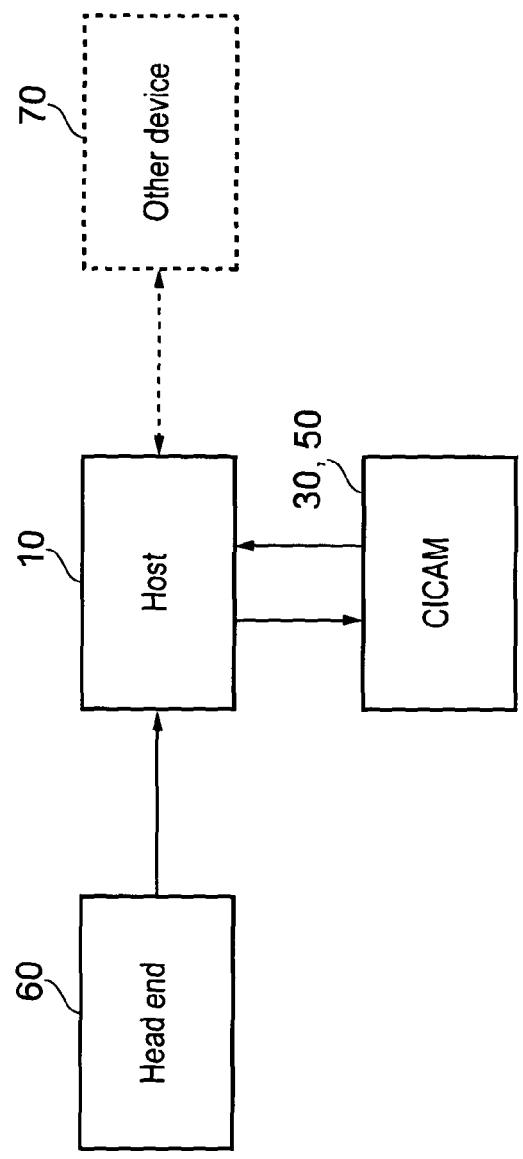
FIG. 2 is a schematic diagram of a conditional access (CA) system incorporating the host device of FIG. 1.

FIG. 2 schematically illustrates the host device 10 in the context of a conditional access system. A so-called head end 60 represents the source of the access-controlled television signal 15. The head end may represent, for example, an uplink station of a satellite broadcaster or a signal distribution centre of a terrestrial or cable broadcaster. The CA system scrambles content at the head end using a CA system encryption. The head end can also introduce other CA-related information into the encrypted data stream which enables the CICAM to descramble the content and to manage the subscriber's (user's) access and entitlements.

The head end 60 sends the television signal 15 to the host 10 which in turn passes the signal to the CICAM 30 for decryption of the access control encryption. The CICAM 30 then re-encrypts the signal using a local encryption and sends the re-encrypted signal back to the host 10 via the PCMCIA connection. The host decrypts the signal received from the CICAM 30 for display on a display screen or for supply to another device 70 such as a hard disk based video recorder.

Figure 3:
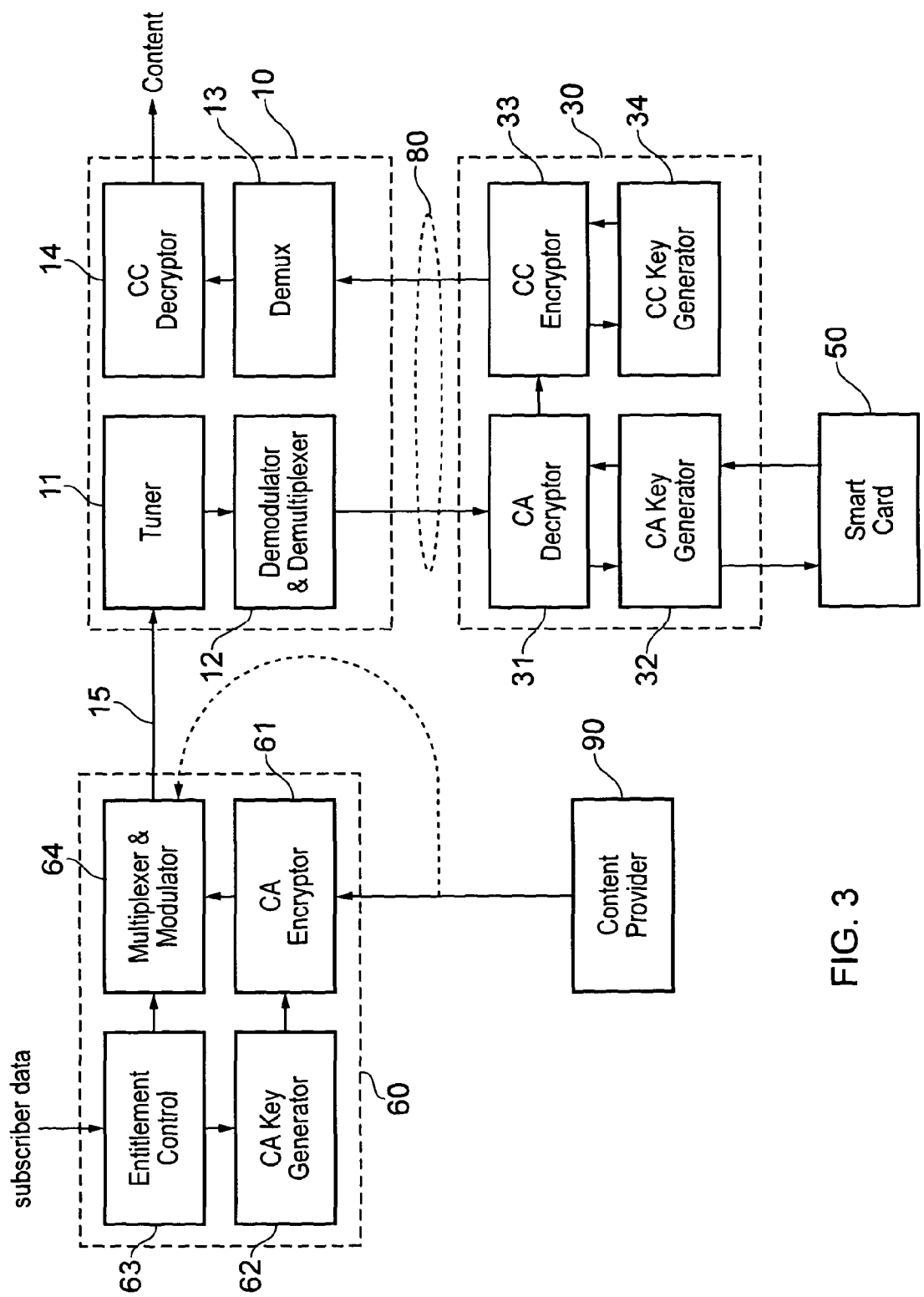
FIG. 3 is a schematic diagram illustrating the operation of the system of FIG. 2.

FIG. 3 is a schematic diagram illustrating the operation of the system of FIG. 2. The detailed operation of the system of FIG. 3 is described in the CI Plus Specification 1.3 (2010-01), available (at the time of filing) at http://www.ci-plus.com/data/ci-plus_specification_v1.3.pdf. This document is incorporated by reference into the present description. The present description of FIG. 3 simply provides an overview of that detailed operation, for the purposes of placing the subsequent description into the appropriate technical context.

As before, FIG. 3 shows the head end 60 (which receives a content signal from a content provider 90), the host device 10, the CICAM 30 and the smart card 50. The signal 15 is shown passing from the head end 60 to the host device 10. The secure interface 80 between the host device 10 and the CICAM 30 is referred to as the common interface.

Conditional Access

Known CA systems provide techniques by which a user can be denied or allowed access to a digital television stream. Access is provided only to those subscribers or users with valid payment accounts. In practical terms, a user is provided with a smart card 50 identifying that user in (ideally) a tamper-free way, and the system is set up so that only users with valid smart cards are able to obtain access to the access-controlled content.

Access control is provided by the use of scrambling and encryption. The content signal is scrambled with an 8-byte control word, which is changed frequently (up to several times per minute) to avoid the CA system being compromised by outside knowledge of the control word. The control words are transmitted to the receiver's CICAM, for descrambling of the scrambled content, in an encrypted form as an entitlement control message (ECM). The CICAM decrypts the control word to allow descrambling of the access-controlled content only when it is authorised to do so by receipt of an entitlement management message (EMM). EMMs are specific to each user or group of users; the CICAM confirms the rights which an EMM provides by comparing the user identification provided in the EMM with user information provided in the smart card 50. The EMMs can be sent less frequently than the ECMs, with intervals between successive EMMs in current commercial systems varying between 12 minutes and six weeks.

ECMs and EMMs themselves are well known message types in MPEG television distribution systems. The format of their payloads can be specific to the CA system in use, with the differences between formats often being semantic rather than having technical significance.

Head End

The head end 60 comprises a CA encryptor 61, a key generator 62, an entitlement control unit 63 and a multiplexer and modulator 64.

The content provider 90 supplies content (such as television signals) to the head end 60. The head end 60 applies conditional access (CA) scrambling and encryption to the content.

More specifically, the CA encryptor 61 encrypts or scrambles the content using a CA key as a control word. The CA key is generated by the CA key generator 62. The scrambled content generated by the CA encryptor is supplied to the multiplexer and modulator 64.

The CA key is also provided to the entitlement control unit 63, which generates ECMs based on the CA keys and EMMs based on subscriber data defining which subscribers are entitled to descramble which content streams. The ECMs and EMMs are supplied to the multiplexer and modulator 64. One or more scrambled content streams from the CA encryptor 61, one or more unscrambled (open access or "free to air") content streams and the entitlement control messages are multiplexed together to form a transport stream such as an MPEG2 transport stream. Known formats are used to carry the content data, the ECMs and the EMMs. The ECMs, EMMs and data defining the type of scrambling used on each elementary stream (corresponding to individual scrambled content streams) are provided in a known format in a conditional access table (CAT) which has a predetermined program identifier (PID) of 0x001, so that the CAT can be recognised at the CICAM.

The multiplexed transport stream is then modulated by the multiplexer and modulator 64 for transmission as a cable, satellite or terrestrial broadcast signal 15.

Host Device

The host device 10 comprises a tuner 11, a demodulator and demultiplexer 12, a demultiplexer ("demux") 13 and a CC (content control) decryptor 14. Note that the host device may have other additional functions, such as network (IPTV) television reception.

Depending on the type of broadcast signal 15, the tuner acts to transform the received signal back to baseband, so that the demodulator and demultiplexer 12 can select and demultiplex a single elementary content stream and associated CAT data from the received signal. The content stream and ECM/EMM data are passed via the common interface 80 to the CICAM 30.

In the case of access-controlled content data, at this stage the content data is still scrambled as it is passed via the common interface 80 to the CICAM 30. This part of the transmission over the common interface 80 is therefore secure by virtue of the CA encryption.

Assuming the ECM and EMM allow it, the CICAM 30 descrambles the content data and re-encrypts it using a content control (CC) encryption. The way in which this is done will be described below. The CC encrypted data is returned to the host device 10 where it is demultiplexed by the demux 13 and decrypted by the CC decryptor 14, so that it can be displayed or passed to another device 70 as clear content.

CICAM

The CICAM 30 comprises a CA decryptor 31, a CA key generator 32, a CC encryptor 33 and a CC key generator 34.

The CA decryptor 31 and the CA key generator 32 may be considered as an access control unit for decoding access-controlled broadcast content or other data. The CC key generator 34 and the CC encryptor 33 of the CICAM 30, and the demultiplexer 13 and the CC decryptor 14 of the host device 10 cooperate to provide an encrypted communication link (the common interface 80) for decoded access-controlled encoded broadcast content, between the CICAM and the host device.

The CA decryptor 31 uses keys generated from received ECMs and EMMs by the CA key generator 32, using checks of the user's identity from the smart card 50, to descramble the received access-controlled content. This part of the operation of the CICAM uses known CA techniques to retrieve and apply the CA keys.

Clear content data is passed from the CA decryptor 31 to the CC encryptor 33. However, as this data transfer is entirely internal to the CICAM, it can be rendered secure and tamper proof by known techniques such as by providing the CA decryptor 31, the CC encryptor 33 and the clear content interface within a single integrated circuit device.

The CC encryptor 33 encrypts the descrambled content using a CC key supplied by the CC key generator 34. This key is established by a secure interchange between the CICAM 30 and the host device 10, and is specific to that CICAM-host device pair. The CC-encrypted content is passed over the common interface 80 to the host device 10. Therefore, this part of the common interface is also secure, as the content data is CC-encrypted as it passes to the host device.

Key Exchange

The CICAM 30 and the host device 10 both contain logic, firmware or software providing algorithms for Diffie-Hellman (DH) secure key exchange, hashing and encryption using the known algorithms SHA-256, DES and AES, respective certificates issued by a certifying authority such as CI Plus LLP, and private keys with the corresponding public keys.

When the CICAM 30 is first associated with the host device 10, the CICAM 30 initiates an authentication process with the host device 10. In this process, each device verifies the other's certificate, and the DH key exchange process takes place so as to securely share keys between the two devices. In particular, the CICAM first requests that the host device provides its certificate data. The CICAM verifies the signature on the host device's certificate. The same process is then carried out by the host requesting and verifying the CICAM's certificate. The CICAM and the host then each demonstrate that they possess the private key corresponding to the public key in the certificate by signing a DH public key and sending it to the other device for validation. The CICAM then obtains and verifies an authentication key AKH from the host. The CICAM and host start to compute and exchange key data for the encryption and authentication of data sent over the common interface 80. In this way, the key, key pair or other key information established by the CICAM and the host for communication over the common interface 80 is specific to that CICAM-host pair.

After authentication, the CICAM also starts to compute the CC key. The CICAM can also instruct the host device to compute the CC key. The CC key is then used as described above to encrypt content data passed from the CICAM 30 to the host device 10, according to the AES algorithm. Therefore, it will be understood that the keys used for the secure common interface 80 are specific to a particular CICAM-host pair.

Techniques for using some or all of the arrangements described above to provide access control in the case of television content delivered over the internet (so-called IPTV or internet protocol television) will now be described.

In general terms, and referring to FIG. 4, an IPTV provider's head end 160, acting as a content source, delivers access controlled television content to the host device running a host application 110 (the host device acting as a content receiver) over an internet data connection 120. The host application communicates with the head end 160 and with an associated CICAM 130 to confirm the user's rights to the content. If the rights are valid then the head end 160 starts to send the content to the host application as video over IP which may be scrambled using an encryption technique such as the AES algorithm. The host application 110 descrambles and renders the received content for display on a display screen 140. Note that a CICAM is not normally needed in the context of IPTV reception; the content receiver shown in FIG. 4 is in fact configured to receive content over the internet data connection 120 and, in another operational mode, to receive access-controlled encoded broadcast content signals 15 via a separate broadcast data path. The broadcast content source and the internet content source may be the same content source (operating in different modes) or may be different content sources. The content source and content receiver together form a content delivery system.

In the techniques to be described below, either the CC key itself is used to descramble the scrambled IPTV content, or the CC encryption is used to securely transmit a key, which has been obtained by the CAM from the host, from the CAM to the host. In either situation, the content source and the CAM are arranged to communicate via the internet data connection so as to establish the key required by the decryptor in the host device to decrypt the encrypted content received from the IPTV content source.

FIG. 5 schematically illustrates content signal handling within the IPTV content delivery system of FIG. 4.

The features shown in FIG. 5 bear a similarity to those shown in FIG. 3, but in the context of IPTV delivery in which the content receiver is connected to the content source by an internet connection and is configured to receive content from the content source via the internet connection and to receive access-controlled encoded broadcast content from that or another content source by a separate broadcast data path (such as a satellite, terrestrial or cable link).

The head end 160 comprises a DRM (digital rights management) encryptor 161 which receives content data from the content provider 90 and a key from a DRM key generator 162. Communication of the DRM keys to or from the content receiver is handled by a DRM message controller 163. Content and message data are packetised for transmission over the internet data connection 120 by a packetiser 164. The DRM encryptor 161 acts as an encryptor for sending encrypted content to the content receiver via the internet data connection 120 according to a content encryption key.

The host application comprises an IP (internet protocol) interface 111 which passes received data to a depacketiser 112. A content extractor 113 retrieves content from the depacketised data and passes the content to a DRM decryptor 114 which decrypts the encrypted content received from the content source via the internet data connection 120, for example for passing to the display 140.

The system includes a removable CI Plus CAM (CICAM) 130 but many features of the CICAM 130 are not used in the IPTV transmission system. Those that are relevant to the present discussion (though not necessarily to the content signal handling shown in FIG. 5) are a CC key generator 134 and a CC encryptor 133. The smart card 50 may still be connected to the CICAM 130 and may or may not be used in this system for user authentication.

The content distribution path in FIG. 5 is therefore as follows. The host application 110 and the head end 160 interact to establish the fact that content data is to be sent from the head end 160, acting as a content source, to the host application 110, acting as a content receiver. This stage of the interaction can be conventional. For example, a user of the host application may direct the host application to an internet address relating to the head end, with the head end acting in an internet broadcast more or a point to point transmission mode. Or the user of the host application may select content for viewing (such as a video on demand (VOD) movie) and the host application consults a look-up-table to determine a head end from which that content may be received, the host application then issuing a request to that head end. The head end may already have started distributing the required content (in the case of a multi-receiver or broadcast mode of operation) or may start the distribution in response to a request from the host application.

The DRM encryptor 161 of the head end 160 encrypts the required content with a content key. The DRM decryptor of the host application also holds that key (in the case of a symmetrical encryption algorithm) or a complementary private key (in the case of an asymmetrical or public-private key encryption algorithm). The way in which the keys are distributed will be described with reference to FIGS. 6 to 8 below.

The encrypted content is packetised and sent by the head end 160, via the internet data connection 120, to the host application 110 where it is depacketised and the DRM-protected content is decrypted by the DRM decryptor 114 for display.

In embodiments of the invention, the CICAM 130 need take no direct part in the IPTV content distribution data path; it is just used in providing or distributing key information.

FIG. 6 schematically illustrates key data handling within the IPTV content delivery system of FIG. 4.

The individual features of FIG. 5 are reproduced in the drawing of FIG. 6, except for the depacketiser 112 which is not required for the key distribution path.

There are two main alternative modes of operation of the apparatus shown in FIG. 6. A first mode will be described with reference to the schematic flow chart of FIG. 7, and a second mode will be described with reference to the schematic flow chart of FIG. 8. Note that FIG. 8 shows only those steps which are different to the flow chart of FIG. 7. That is to say, the step 230 (to be described below) in FIG. 7 can lead either to a step 240 in FIG. 7, or, in another embodiment, along a different route to a step 270 in FIG. 8.

The arrangement shown in FIG. 7 will be described first. In this arrangement, the CAM and the host module share encryption key information to allow encrypted communication between the CAM and the host module (via the secure interface 80); the CAM is configured to transmit at least a part of that shared key information (the CC key information) to the content source; and the content source is configured to use the key information received from the CAM for encrypting content for transmission to that host module.

The process starts at a step 200, with the CICAM 130 and host application 110 interacting. At a step 210, the CICAM 130 checks whether a key pair already exists for secure data exchange between the CC encryptor 133 of the CICAM and the host application. If such a key pair already exists, then control passes to the step 230. If not, then control passes to a step 220 in which the CICAM and the host application carry out secure key exchange to establish a key pair for secure communication between them.

Note that the steps 210 and 220 relate to the standard operation of a CI Plus CAM, as defined in the specification document referred to above. Note also that in embodiments of the invention (and in the CI Plus standard) the CC Encryptor 133 may use a symmetrical encryption algorithm (such as the AES algorithm), in which case the "key pair" established between the CICAM and the host application represents the same keys for use at each of the two nodes. In other embodiments, the CICAM and the host application may use an asymmetric algorithm in which the initial key exchange takes place so that the CICAM holds a public key corresponding to a private key held by the host application.

At the step 230, the CICAM 130 and the head end 160 establish a secure communications link. This may be, for example, a so-called Low Speed Communications (LSC) link/resource as defined in the CI Plus specification, over the internet connection 120. As defined in the CI Plus specification, LSC is a resource which allows the CAM to use the host device's internet connection (IP port) as a return path to the head end. The CAM and the head end can use authentication and/or encryption and/or message hashing between them to ensure the integrity and security of messages sent using the LSC resource.

At the step 240, the CC encryptor 133 of the CICAM sends key information to the head end. In particular, this key information is related to the key pair already exchanged between the CICAM and the host application, so that the host application may decrypt content from the head end using the same key that it uses to decrypt data sent directly to it from the CC encryptor of the CICAM associated with that host application.

Therefore, in the case that the CC encryptor uses a symmetrical encryption algorithm to send data via the secure interface 80 to the CC decryptor, the CC encryptor 133 of the CICAM sends the shared key used by the CC encryptor to the head end 160, over the secure LSC link, so that the head end can also communicate content to the host 110 using a (or, normally, the same) symmetric algorithm, according to the shared key. The algorithm may be an AES algorithm. In the case where an asymmetrical algorithm is used by the CC encryptor to communicate with the host application, the CC encryptor sends the public key of the public-private key pair to the head end. Note that in the case of only a public key being transmitted, it is not strictly necessary for the link from the CC encryptor 133 to the head end to be a secure link, though in practice a secure link might still be used.

The key information sent to the head end 160 is received by the DRM message controller 163 and is passed to the DRM key generator 162, which arranges that the appropriate key data is supplied to the DRM encryptor 161 for encryption of the content data for transmission to that host application. The head end sends encrypted content data to the host at a step 250 and the host receives and decrypts it using the key established with the CC encryptor 133, at a step 260.

Note that in this embodiment, the DRM encryptor is using an encryption key which is specific to a particular host application, so the encrypted packets are suitable for reception only by that host application.

FIG. 8 schematically the operation of a system in which the content source is configured to communicate key information, for decrypting the encrypted content, to the CAM, and the CAM is configured to transmit the key information received from the content source to the host module via the encrypted communication link (the secure interface 80) between the CAM and the host module.

Referring now to FIG. 8, in an alternative arrangement control passes from the step 230 to a step 270, in which the head end sends a decryption key to the CICAM via the LSC link established by the CAM and the head end. This key is received by the CC encryptor 133 and is passed (at a step 280), via the secure CC link established between the CICAM and the host application, to the host application where it is used by the SRM decryptor 114 to decrypt content received from the head end.

The decryption key sent to the host application via the CICAM may be a symmetrical key or may be a private key of a public-private key pair. The DRM encryptor 161 uses the appropriate complementary key.

Steps 290 and 300 correspond to the steps 250 and 260 described above, except that in the step 300 the host application decrypts the content using the key passed to it by the CC encryptor 133 over the secure link between the CICAM and the host application. Note that in this embodiment, the DRM encryptor is using an encryption key which is not necessarily specific to a particular host application, so the encrypted packets are suitable for reception by that host application and potentially by other host applications which have received the same key from the head end.

In either embodiment, the keys used for content encryption and decryption may be changed at intervals. In the embodiment of FIG. 7, this can be achieved by the CICAM repeating its initial key exchange process (the step 220) with the host application from time to time, and sending the newly established key to the head end. This repeat of the step 220 can be prompted by the CICAM itself, by the host or by a message from the head end. In the embodiment of FIG. 8, the head end can periodically (or, more generally, from time to time) send a new key to the CICAM, either at its own instigation or in response to a request by the CICAM to do so. In embodiments of the invention, the new key is established in advance of a time when the old key will stop being used, so that there is no interruption of the received content.

Embodiments of the invention can also provide a flexible technique for signaling where a receiver should locate an electronic programme guide (EPG) resource.

The background is that the CI Plus standard defines an operator_profile resource which tells the Host what service to store and their LCN (logical channel number). This resource can also be used on networks that the Host does not always understand, such as networks which do not use standard DVB tables.

Currently this resource only informs the Host if the EIT (event information table) being broadcast can be trusted, if it is present, if it crossed carried or Barker channel or if it an application. Looking at the information regarding application does not specify where the application comes from (it could be CAM or broadcast).

Embodiments of the present technique extend the operator_profile resource to include the messaging from the CAM to inform the Host where to get the EPG from, not just to inform if the Host can trust the EIT or if there is an application based EPG. The idea would be for the CAM to inform exactly where the Host can get the EPG information.

Example of this would be:

Broadcast EPG
   EIT (already covered in the CIplus spec)
   Application (Carousel ID)—MHEG, HTML-CE (HbbTV), MHP and/or other
Ethernet (IP Address)
   EIT (DVB tables)
   Application MHEG, HTML-CE (HbbTV), MHP and/or other
CAM
   Application
   EIT (DVB tables in a CI APDU)
Private EPG
   operator and Manufacture private EPG mechanism From this information the Host can re-map the EPG key on the remote to the appropriate EPG mechanism.

It will be understood that the techniques described above may be carried out by specific hardware, general purpose hardware running appropriate software, semi-programmable hardware such as field programmable gate arrays or application specific integrated circuits, or combinations of these. It will be appreciated that where the techniques or part of them are carried out using software, such software, and a storage medium (for example a non-transitory machine readable storage medium such as a magnetic or optical disk or a flash memory) carrying such software, are considered to represent embodiments of the invention.

The invention claimed is:

1. An audio/video content delivery system comprising:
   a content source linked by an internet data connection to a content receiver, the content receiver comprising circuitry configured to receive content from the content source via the internet data connection and to receive access-controlled encoded broadcast content from the content source or another content source by a separate broadcast data path;
   the content source comprising circuitry configured to send encrypted content to the content receiver via the internet data connection according to a content encryption key;
   the content receiver comprising:
     a host module having circuitry configured to decrypt encrypted content received from the content source via the internet data connection; and
     a removable conditional access module (CAM), the CAM including circuitry to decode the access-controlled encoded broadcast content, the circuitry of the host module and the circuitry of the removable CAM configured to provide an encrypted communication link for decoded access-controlled encoded broadcast content between the conditional access module and the host module;

the circuitry of the content source and the circuitry of the CAM configured to communicate via the internet data connection to establish the content encryption key required by the circuitry of the host module to decrypt the encrypted content received from the content source, wherein the circuitry of the content source and the circuitry of the CAM are configured to communicate via the internet data connection through two-way communication to transmit the content encryption key between the content source and the CAM over the internet data connection, wherein the circuitry of the CAM and the circuitry of the host module share encryption key information to allow encrypted communication between the CAM and the host module;

the circuitry of the CAM is configured to transmit at least a part of the shared encryption key information to the content source; and the circuitry of the content source is configured to use the key information received from the CAM for encrypting content for transmission to the host module.

2. The system according to claim 1, in which:

the circuitry of the content source is configured to communicate key information, for decrypting the encrypted content, to the CAM; and the circuitry of the CAM is configured to transmit the key information received from the content source to the host module via the encrypted communication link between the CAM and the host module.

3. The system according to claim 1, in which the circuitry of the CAM and the circuitry of the content source are configured to establish a secure low speed communications link via the internet data connection.

4. The system according to claim 1, in which the circuitry of the content source is configured to encrypt content for transmission to the content receiver using a symmetrical encryption algorithm.

5. The system according to claim 4, in which the encrypted communication link between the CAM and the host module operates according to a symmetrical encryption algorithm.

6. The system according to claim 5, in which the encrypted communication link between the CAM and the host module, the circuitry of the content source and the circuitry of the content receiver, operate according to a same encryption algorithm.

7. The system according to claim 6, in which the encryption algorithm is an AES algorithm.

8. The system according to claim 1, in which the encrypted communication link between the CAM and the host module operates according to key information specific to the CAM and host module pair.

9. The system according to claim 1, in which the content source is configured to send data to the host module as IP television data.

10. The system according to claim 1, in which the CAM is a CAM according to the Common Interface plus standard.

11. The system according to claim 1, in which the circuitry of the content source and the circuitry of the CAM are configured to communicate via the internet data connection so as to change the key required by the circuitry of the host module to decrypt the encrypted content received from the content source from time to time.

12. An audio/video content receiver configured to receive encrypted content from a content source via an internet data connection and to receive access-controlled encoded broadcast content from the content source or another content source by a separate broadcast data path, the content receiver comprising:

a host module including circuitry configured to decrypt encrypted content received from the content source via the internet data connection;

a removable conditional access module (CAM), the CAM including circuitry configured to decode the access-controlled encoded broadcast content, the circuitry of the host module and the circuitry of the removable CAM configured to provide an encrypted communication link for decoded access-controlled encoded broadcast content between the conditional access module and the host module through the interface; and an interface comprising circuitry configured to cooperate with the removable CAM;

wherein the circuitry of the CAM is configured to communicate with the content source via the internet data connection to establish a content encryption key required by the circuitry of the host module to decrypt the encrypted content received from the content source, wherein the circuitry of the content source and the circuitry of the CAM are configured to communicate via the internet data connection through two-way communication to transmit the content encryption key between the content source and the CAM over the internet data connection, wherein the circuitry of the CAM and the circuitry of the host module share encryption key information to allow encrypted communication between the CAM and the host module;

the circuitry of the CAM is configured to transmit at least a part of the shared encryption key information to the content source; and the circuitry of the content source is configured to use the key information received from the CAM for encrypting content for transmission to the host module.

13. An audio/video content delivery method in which a content source is linked by an internet data connection to a content receiver, the content receiver comprising circuitry configured to receive content from the content source via the internet data connection and to receive access-controlled encoded broadcast content from the content source or another content source by a separate broadcast data path, and the content receiver including a host module including circuitry configured to decrypt encrypted content received from the content source via the internet data connection and a removable conditional access module (CAM), the CAM including circuitry configured to decode the access-controlled encoded broadcast content, the circuitry of the host module and the circuitry of the removable CAM configured to provide an encrypted communication link for decoded access-controlled encoded broadcast content between the conditional access module and the host module;

the method comprising:

the circuitry of the content source and the circuitry of the CAM communicating via the internet data connection so as to establish a decryption key required by the circuitry of the host module to decrypt the encrypted content received from the content source; and the circuitry of the content source encrypting and sending encrypted content to the content receiver via the internet data connection according to a content encryption key appropriate to the decryption key established at the circuitry of the host module, wherein the circuitry of the content source and the circuitry of the CAM are configured to communicate via the internet data connection through two-way communication to transmit the content encryption key between the content source and the CAM over the internet data connection, wherein the circuitry of the CAM and the circuitry of the host module sharing encryption key information to allow encrypted communication between the CAM and the host module;

the circuitry of the CAM transmitting at least a part of the shared encryption key information to the content source; and the circuitry of the content source using the key information received from the CAM for encrypting content for transmission to the host module.

\* \* \* \* \*